Patented Oct. 25, 1927.

1,646,596

UNITED STATES PATENT OFFICE.

HERMAN REINBOLD, OF OMAHA, NEBRASKA.

PROCESS OF PREPARING A MEDIUM FOR THE TREATMENT OF WATER.

No Drawing.   Application filed August 10, 1925.   Serial No. 49,457.

This invention relates to agents for use as coagulants and precipitants in the purification and rectification of water and is adapted for use in large installations such as municipal water works and the like, and as a boiler water treatment.

The principal object of the invention is to provide an agent or medium which will be more effective and more economical than sulphate of alumina and other agents at present in use.

Another object of the invention is to provide a material which will, in addition to acting as a coagulant, and precipitant, also act as a base exchange water softening agent.

Still another object of the invention is to provide a material which will serve not only as a coagulant, precipitant, and softening agent, but will also have germicidal action.

A further object is to provide a medium which may be shipped as a dry powder unaltered by contact with the atmosphere.

Other objects reside in the improved medium and its uses which will become more apparent in the following description.

My improved medium is prepared by intimately mixing dry sodium hydroxide with bentonite or other hydrous alumino silicate. The mixture is kept in mechanical agitation by any desirable means. During the agitation, a gradual decomposition takes place whereby the sodium radicle is gradually taken up by the bentonite forming a gelatinous or gummy mixture comprising a sodium silico aluminate or a colloid mixture of sodium silicate and sodium aluminate. Since bentonite contains from 7 to 15 per cent moisture, part of which is water of constitution, the mixture is endothermic, that is, chemical change causes an evolution of heat as the formation of sodium silico aluminate progresses.

The amount of sodium hydroxide to be added to the bentonite varies from 15 to 30 per cent according to the alumina content of the bentonite. Enough caustic soda should be used, however, to properly unite with the aluminum oxide to render the product alkaline after the reaction is complete, but not sufficient to leave free caustic in excess. Tests should be made to detect free caustic for uses where the latter would be objectionable.

For economical reasons, sodium carbonate may be used in the place of sodium hydroxide, or mixed therewith, in special cases where the presence of carbonates in the water is not objectionable. If sodium carbonate is used, of course the amount will have to be increased to furnish the necessary equivalent of soda base to form the aluminate.

No additional water or supplementary heat or further treatment is necessary to form the sodium silico aluminate. The only thing to be considered is the time factor. The chemical reaction is substantially complete as soon as all the heat is evolved and the mass is cold. In terms of colloid chemistry, the compound consists of a solid gel containing its constituents colloidally or in dispersion. After cooling, the product is dried sufficiently with warm air to permit of grinding. It may be granulated in an ordinary grinder or pulverized to an impalpable powder in a colloid mill. It may be furnished to the consumer in either form. The agent may be shipped in any desirable container since unlike some of the usual treating mediums, such as sodium aluminate, it is not subject to decomposition by contact with the atmosphere and is not liquid. Sodium aluminate at present in use for the purpose must be shipped in closed drums and be re-treated with sodium hydroxide before use if aluminum hydrate has been formed by contact with the atmosphere. With the use of the present agent, however, re-treatment with sodium hydroxide is never necessary.

While the highest and best grades of bentonite are several hundred times more adsorbent than charcoal, the efficiency of the product may be still more increased by grinding and passing it through a colloid mill.

In use, the agent is placed directly into the water to be treated, in an amount proportional, of course, to the condition of the water. This may be easily determined by any of the usual tests. It is preferred in practice to dissolve a certain amount of the powdered product in a small quantity of water to form an emulsion or semi-liquid jelly which is brought to a certain pre-determined specific gravity depending on the method of use and size of tanks. This product is then fed directly into the boiler with the feed water or in water purification plants is run into the filter or settling tank.

At present, aluminum sulphate or alum is the usual agent for rectification of water. The coagulation of organic matter by alum is caused by the fact that on extended dilution, the alum finally forms floccules of aluminum hydroxide in neutral or slightly alkaline solutions. The flocculated bentonite acts similarly but is very much more porous and colloidal than the aluminum hydroxide so that its coagulating and precipitating qualities are much more efficient, thus allowing a smaller amount to be used for a given quantity of water. In addition my improved medium will act as a base exchange agent and remove the hardening elements from the water thus preventing the formation of scales when the water is used in boilers.

When used for treating water carrying alkalies, other bases and hardening elements, the alkali and bases will be gradually exchanged and the sodium radicle will dissolve as a soduble sodium salt and be replaced in the medium by lime, magnesia or other hardening constituents present in the water. After all of these bases have been exchanged, and exhausted, the remaining alkali metal compound will precipitate as a very finely divided powder which will in addition to the remaining insoluble jell coagulate and precipitate organic matter from the water to the bottom as a sludge, which may be run to waste and discarded. The sludge consists of an insoluble compound of the alumino-silicate with the lime, magnesia, iron, etc., originally present in the water.

Should it be necessary at water purification plants to employ some medium for the destruction of bacteria, the medium may be treated so that it will have germicidal qualities as well as those previously described, and comprises the treatment of the agent with chlorine gas by adsorption to saturation at ordinary temperatures thus forming sodium hypochlorite in colloidal dispersion throughout the entire porous mixture. Since the mixture is highly adsorbent, considerable free chlorine will be held in suspension. The sodium hypochlorite and the chlorine are both powerful germicides. It is not necessary to employ any other germicidal treatment upon water which has been treated with the medium so prepared.

While I have described in some detail one preferred method of carrying out my process, together with the theories which I believe to explain the success of the process, it is understood that my invention is not limited to the precise procedure described nor is dependent upon the accuracy of the theories which I have advanced. On the contrary, my invention is not to be regarded as limited except in so far as such limitations are included within the terms of the accompanying claims, in which it is my intention to claim all novelty inherent in my invention as broadly as is permissible in view of the prior art.

Having thus described the invention, what I claim and desire secured by Letters Patent is:—

1. The process of preparing a water treating medium and germicide comprising treatment of hydrous sodium silico aluminate with chlorine gas.

2. The process of preparing stable hypochlorites comprising the treatment of sodium silico aluminate with chlorine gas.

3. The process of preparing a medium for the treatment of water comprising adding sodium hydroxide to a hydrous alumino silicate and treating the product with chlorine gas.

4. The process of preparing a medium for the treatment of water comprising adding sodium hydroxide to a hydrous alumino silicate and forming colloidal hypochlorites in the product by treatment with chlorine gas.

In testimony whereof, I affix my signature.

HERMAN REINBOLD.